United States Patent
Krecioch et al.

(10) Patent No.: US 10,496,274 B2
(45) Date of Patent: Dec. 3, 2019

(54) GEOFENCE PARAMETERS BASED ON TYPE OF TOUCH ON A TOUCH SCREEN

(71) Applicant: MOTOROLA SOLUTIONS, INC, Chicago, IL (US)

(72) Inventors: Lukasz Stanislaw Krecioch, Chocznia (PL); David E. Klein, Parkland, FL (US); Marta Tatiana Musik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/079,164

(22) PCT Filed: Apr. 20, 2016

(86) PCT No.: PCT/PL2016/050013
§ 371 (c)(1),
(2) Date: Aug. 23, 2018

(87) PCT Pub. No.: WO2017/184000
PCT Pub. Date: Oct. 26, 2017

(65) Prior Publication Data
US 2019/0034077 A1  Jan. 31, 2019

(51) Int. Cl.
*G06F 3/0488* (2013.01)
*H04W 4/021* (2018.01)
*G06F 3/0484* (2013.01)

(52) U.S. Cl.
CPC ...... *G06F 3/04883* (2013.01); *G06F 3/04847* (2013.01); *H04W 4/021* (2013.01)

(58) Field of Classification Search
CPC . G06F 3/04883; G06F 3/04847; H04W 4/021
See application file for complete search history.

(56) References Cited

U.S. PATENT DOCUMENTS

| | | | |
|---|---|---|---|
| 7,394,403 B2 | 7/2008 | Winkler et al. | |
| 8,334,766 B2 | 12/2012 | Teran-Matus et al. | |
| 9,210,271 B2 | 12/2015 | Czaja et al. | |
| 9,224,282 B2 | 12/2015 | Lee et al. | |
| 2012/0054665 A1 | 3/2012 | Kano et al. | |

(Continued)

FOREIGN PATENT DOCUMENTS

| | | | |
|---|---|---|---|
| KR | 20140020576 A | * | 2/2014 |
| KR | 20140020576 A | | 2/2014 |

(Continued)

OTHER PUBLICATIONS

Anonymous: "Geo-fence", Wikipedia, Mar. 9, 2016, retrieved from the Internet: URL:https://en.wikipedia.org/w/index.php?title=Geofence&oldid=709158306 [retrieved on Jan. 5, 2017], all pages.

(Continued)

*Primary Examiner* — Nitin Patel
*Assistant Examiner* — Amy Onyekaba
(74) *Attorney, Agent, or Firm* — Kenneth A. Haas

(57) ABSTRACT

A method and apparatus for creating a geofence is provided herein. During operation, a pressure and/or velocity of a touch or swipe on a touch screen is measured during the geofence creation. The geofence will be created with parameters based on the pressure and/or velocity of the touch or swipe.

10 Claims, 4 Drawing Sheets

(56) References Cited

U.S. PATENT DOCUMENTS

| | | |
|---|---|---|
| 2012/0086705 A1 | 4/2012 | Tsang |
| 2012/0282878 A1* | 11/2012 | Amis ............... H04W 4/90 455/404.1 |
| 2013/0147850 A1 | 6/2013 | Hao et al. |
| 2013/0307788 A1 | 11/2013 | Rao et al. |
| 2014/0028606 A1 | 1/2014 | Giannetta |
| 2015/0181382 A1* | 6/2015 | McDonald ......... H04L 67/18 455/456.3 |
| 2015/0346968 A1* | 12/2015 | Johnson ............ G01C 21/00 715/771 |
| 2017/0131896 A1* | 5/2017 | Park .................. G06F 3/04883 |
| 2017/0230792 A1* | 8/2017 | Shaik ................ G06F 3/04847 |
| 2017/0289074 A1* | 10/2017 | Joo ................... H04L 51/04 |
| 2017/0318147 A1* | 11/2017 | Merjanian ......... H04M 3/5116 |
| 2017/0359685 A1* | 12/2017 | Lu ..................... H04W 4/021 |

FOREIGN PATENT DOCUMENTS

| | | |
|---|---|---|
| WO | 2010080101 A1 | 7/2010 |
| WO | 2013120163 A2 | 8/2013 |

OTHER PUBLICATIONS

Piotr Szczytowski: "Geo-fencing Based Disaster Management Service" In: "Communications in computer and information science", May 9, 2014 (May 9, 2014), Springer, DE, XP055332673, ISSN: 1865-0929 vol. 498, pp. 11-21, DOI: 10.1007/978-3-662-46241-6-2, abstract p. 2, lines 1-17 p. 4, lines 9-16 p. 4, lines 29-end p. 5, line 13-p. 7, line 12; figures 1-3 section 3.2;p. 8.

The International Search Report and the Written Opinion, corresponding serial No. PCT/PL2016/050013, filed Apr. 20, 2016, dated Jan. 16, 2017, all pages.

* cited by examiner

GEOFENCE PARAMETERS BASED ON TYPE OF TOUCH ON A TOUCH SCREEN

FIELD OF THE INVENTION

The present invention generally relates to creating a geofence, and more particularly to a method and apparatus for creating a geofence having parameters based on a type of touch on a touch screen.

BACKGROUND OF THE INVENTION

Many public safety or other private or government wireless communication systems provide for group-based radio communications amongst a plurality of radios (subscriber units) within a geofenced area. During the formation of a geofence, all radios within the geofence will share certain geofence parameters (e.g., channel, alerts, . . . , etc). For example, at a mining site, events such as blasting operations impart unique alerting requirements on the wireless communication system and subscriber devices operating within a geofence in preparation for, and perhaps during, a blasting operation. In other situations, a group of subscriber devices may need to be alerted about events such as hazardous material leaks or weather alerts relative to a particular geofenced area.

During geofence creation, the actual creation of the fence is predicated on additional understanding or concern about an incident scene encompassed by the geofence. Because the types of incidents vary, the parameters of the geofence may vary as well. For example, geofences can border high value areas such as schools or parks that would cause greater concern or resource deployment along with ensuring blockage of escape routes. Additionally, the incident may also require highlighting of environmental elements that could cause a challenge to managing a geofence. This could include area of dry brush or exposed high wind areas while managing a fire break during a wild forest fire.

It would be helpful to those who create geofences to have a quick and intuitive way to communicate geofence parameters quickly so that the parameters can be quickly understood by users.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
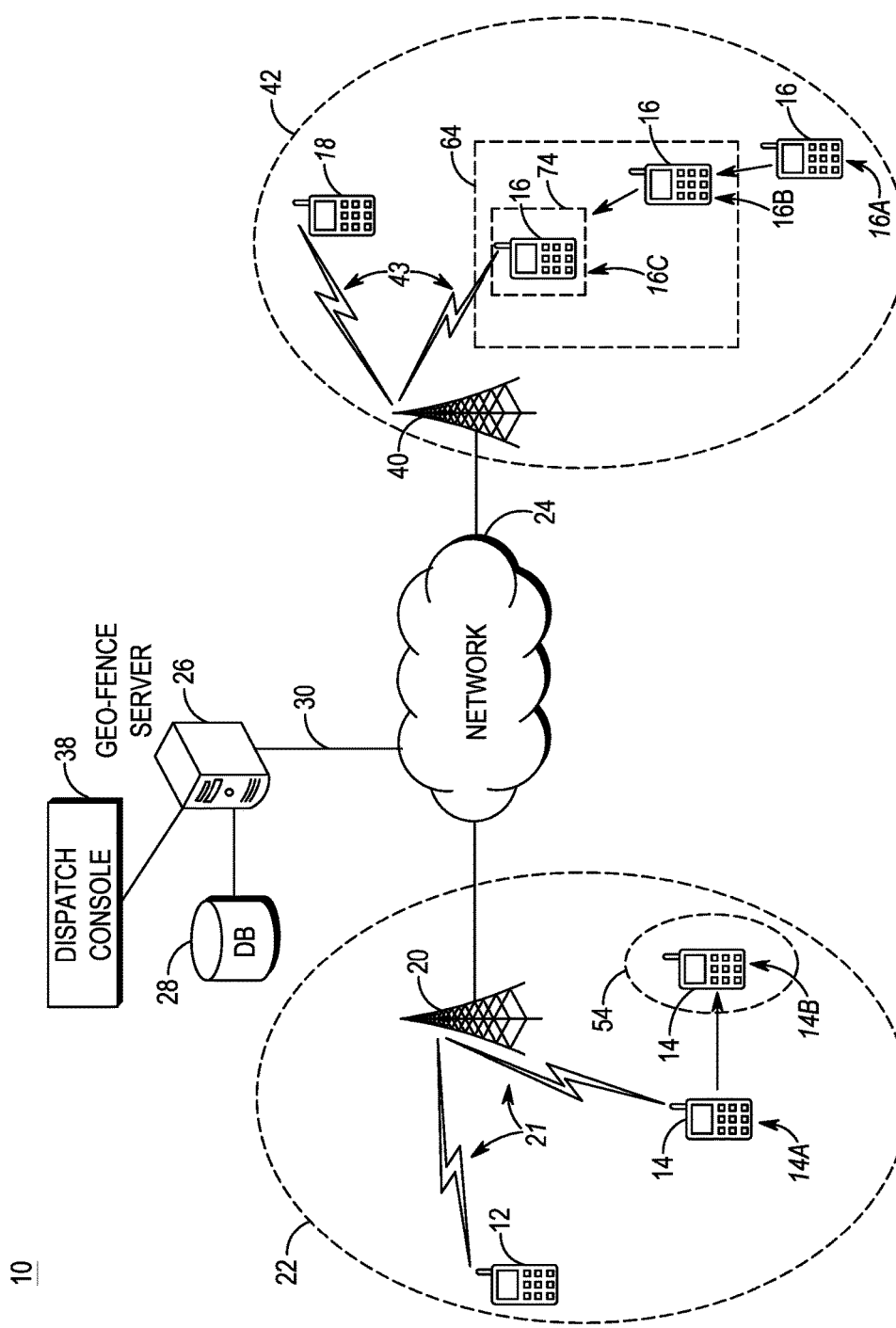
FIG. 1 illustrates a general operating environment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for creating a geofence is provided herein. During operation, a pressure and/or velocity of a touch or swipe on a touch screen is measured during the geofence creation. The geofence will be created with parameters based on the pressure and/or velocity of the touch or swipe.

It should be noted that the term "geofence" is envisioned to encompass a virtual geographical boundary or a virtual barrier. Additionally, the term "geofence parameter" is envisioned to encompass an operating parameter of the geofence that can be determined by a type of touch. Such parameters include, but are not limited to a geofence border requiring higher than typical resource deployment along that border, environment risk levels, rate of movement around the geofence boundary, hysteresis associated with geofence border crossing alerts (for example, a time period before an alert will be given that an individual has crossed a geofence border), and/or allowed individuals within a geofence. As one of ordinary skill in the art will recognize, a software program is typically utilized to create the geofence and then track locations of individuals to determine their behavior and location with respect to the geofence and its parameters.

As an example of the above, consider an individual operating a touch-screen device, and creating a geofence by dragging their finger across a map displayed on the touch screen. A geofence parameter such as a complete exclusion of individuals within the geofence can be conveyed based on a pressure that the user's fingers make with the touch screen. For example, a very heavy pressure on the touch screen during geofence creation may automatically convey a complete exclusion of individuals from within the geofence.

Consider a geofence created around a blast at a mining site. The creator of the geofence, using a heavy-pressure when drawing the boundaries, will automatically convey that no personnel are allowed within the geofence. The geofence server will appropriately warn anyone wandering into the geofence. Alternatively, a lighter-pressure swipe may convey that only certain individuals are allowed within the area (e.g., those preparing for the blast).

As another an example of the above, consider an individual operating a touch-screen device, and creating a geofence by dragging their finger across a map displayed on the touch screen. A parameter such finger pressure can convey a maximum speed of a user, vehicle, or drone within the geofence. Finger pressure can also convey exposure dangers associated gas, fire, high winds, or other environment dangers with moving slowly. Additional dangers can include, but not limited to exposure to an active shooter or redrawing the geofence due to an incident change where additional resources, vehicles, or drones need to be migrated to a different geofence border.

As another an example of the above, consider an individual operating a touch-screen device, and creating a geofence by dragging their finger across a map displayed on the touch screen. The geofence can be created with a differing speed or pressure of one's finger. A parameter such as hysteresis can be based on the speed/pressure. (In this case, the term "hysteresis" is a parameter that defines the variability of crossing the geofence). This parameter can vary based on proximity of that particular geo-fence border to the dangerous area of the incident. For example, the alert requirements associated with an entry road to an active incident could be relaxed compared to the geo-fence drawn for a fire break on a ridge during a wide fire where entry past the geo-fence directly places the user in immediate danger.

Geofences for incidents are typically defined from an incident management perspective, therefore there are parameters such as areas/borders associated with the response management elements; including incident commander, response vehicle or drone positions, and already managed areas; while other borders are directly related to the hazards of the incident; including burning fires, gas or hazardous element areas, or uncontrolled areas controlled by criminal elements. The ability to convey the priority of a given border or crossing of a border will vary from edge to edge and incident to incident.

Turning now to the drawings, wherein like numerals designate like components, FIG. 1 illustrates a general operating environment. More particularly, FIG. 1 illustrates a communications network 10 including client radios (subscriber devices) 12, 14, 16, 18, fixed terminals 20, 40 (e.g. base stations), wireless links 21, 43, backhaul network 24, geofence server 26, database 28, communications connections 30, 32, 36, and dispatch console 38. Each base station 20, 40 has at least one radio transmitter covering a radio coverage cell (22, 42). One or several radios 12, 14, 16, 18 within radio coverage cells 22, 42 of the respective base stations 20, 40 may connect to the base stations 20, 40 using a wireless communication protocol via respective wireless links 21, 43. The radios 12, 14, 16, 18 may communicate with each other, and perhaps other devices accessible via other network links, using a group communications protocol over wireless links 21, 43. Wireless links 21, 43 may be, for example, a wireless link supporting a protocol such as GPRS or UMTS, 2G, (e.g. GSM), 3G (e.g. WCDMA or LTE), iDEN, wireless LAN (WLAN), or ETSI Digital Mobile Radio (DMR), among other possibilities. The radios 12, 14, 16, 18 may be configured with an identification reference (such as an IMSI, International Mobile Subscriber Identity, or an SUID, Subscriber Unit Identifier) which may be connected to a physical media (such as a SIM card, Subscriber Identity Module).

Each radio 12, 14, 16, 18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single radio, such as radio 14, to communicate with one or more members (such as radios 12, 16-18) associated with a particular group of radios at the same time. Radios 12, 14, 16, 18, base stations 20, 40, and/or an infrastructure controller (not shown) may cooperate to define groups of radios and enable the one-to-many communications feature provided by communications network 10. As radios are mobile, they may move within, into, out of, and/or between radio coverage cells 22, 42. For example, radio 14 may move from an initial location 14A within radio coverage cell 22 to a subsequent location 14B also within radio coverage cell 22. Similarly, radio 16 may move from an initial location 16A outside of radio coverage cell 42 to a secondary location 16B within radio coverage cell 42, and then to a final location 16C also within radio coverage cell 42.

Although a limited number of radios and base stations are illustrated in FIG. 1, the present disclosure is not limited as such, and more or fewer radios and more or fewer base stations could be used in any particular implementation. Furthermore, while a single geofence server 26 is illustrated in FIG. 1, more than one geofence server 26 may be used and/or a distributed geofence server 26 may be used that divides functions across multiple devices, perhaps for load balancing reasons. Finally, while database 28 is illustrated as directly coupled to geofence server 26, database 28 may also be remote from geofence server 26 and accessible to geofence server 26 via one or more of network 24.

The base stations 20, 40 may be linked to the geofence server 26 via network 24 and communications connection 30. Network 24 may comprise one or more routers, switches, LANs, WLANs, WANs, access points, or other network infrastructure. For example, geofence server 26 may be accessible to base stations 20, 40 via a dedicated wireline or via the Internet. In one example, base stations 20, 40 may be directly coupled to geofence server 26 via one or more internal links under control of a single communications network provider.

Geofence server 26 may be a separate device or may lie internal to network equipment. Server 26 is configured to maintain a database of geofences and their associated parameters. The geofences maintained are within one or more radio coverage cells of one or more base stations with which it is associated, and may provide mechanisms and/or interfaces for activating or de-activating existing geofences it is maintaining, for adding new geofences, and for deleting existing geofences. Geofence server 26 may also comprise an application running at the dispatch center (dispatch console 38). The geofence server 26 may further maintain mappings that identify parameters (some discussed above) for each active geofence in the database. The geofence server 26 may further provide mechanisms and/or interfaces for modifying assigned geofence parameters in the mapping, for adding a new mapping that assigns an existing geofence definition to associated geofence parameters, and for removing an existing mapping. In other embodiments, geofence server 26 may be embodied within or coupled to another network device, such as a base station controller (BSC), mobile switching center (MSC), site controller, zone controller, Push-to-Talk controller, or other network device, inside network 24 or outside of network 24.

Geofence server 26 may be fed location updates for all radios and propagate geofence parameters to the radios based on their location within one or more geofences. In another embodiment, server 26 may simply provide geofence parameters and boundary information to each radio, and have the radios themselves change parameters as necessary. In another embodiment, geofence server may receive geofence parameters (e.g., location and additional parameters as described above) from devices via network 24, and propagate the geofence and its parameters to devices in the field.

Database 28 may function to store geofence boundaries and geofence parameters, and mappings and provide them, upon request, to geofence server 26. For example, database 28 may store a first geofence definition (area of operation and geofence parameters) defining a first geofence 54, and a second geofence definition defining a second geofence 64, and a third geofence definition defining a third geofence 74 that is within (e.g., a sub-region of) geofence 64. Geofence definitions may include a set of three or more polygon vertices, where each polygon vertex is a GPS coordinate, such as latitude and longitude pair, or some other form of cartographic definition. Additionally or alternatively, geofence definitions may include a point and radius, where the radius is a distance criterion and the point is a GPS coordinate (which may be in motion), such as a latitude and longitude pair, or some other form of cartographic definition. Further, geofence definitions may include of a set of two diagonally opposing rectangular vertices, where each rectangular vertex is a GPS coordinate (which may be in motion), such as a latitude and longitude pair, or some other form of cartographic definition. Other possibilities exist as well.

Communications system 10 may implement, in one embodiment, a narrow-band trunked radio communication system in which radios 12, 14, 16, 18 transmit control and data messages in accordance with an air interface protocol such as that defined by the ETSI Digital Mobile Radio (DMR), Terrestrial Trunked Radio (TETRA), or Association of Public-Safety Communications Officials 25 (APCO P25) standards. In a trunked radio communication system, frequencies are assigned for talk group use on an as-needed basis, and signaling over a control channel is used to direct radios to a particular channel to receive a particular group communication. In another embodiment, communications system 10 may implement a PTT over Cellular (OMA-PoC) or PTT over IP (PoIP) broadband architecture in which radios 12, 14, 16, 18 transmit control and data messages in accordance with a protocol such as real-time transport protocol (RTP) and/or session initiation protocol (SIP). Other possibilities exist as well.

Dispatch console 38 lies within a dispatch center (not shown) and may be directly coupled to geofence server 26 as shown, or may be indirectly coupled to geofence server 26 via one or more of network 24. The dispatch console 38 may provide an administrative or dispatch access to radios 12, 14, 16, 18 and geofence server 26, and allow an administrator or dispatcher to initiate infrastructure-sourced group communications to groups of radios 12, 14, 16, 18, among other features and functions.

Figure 2:
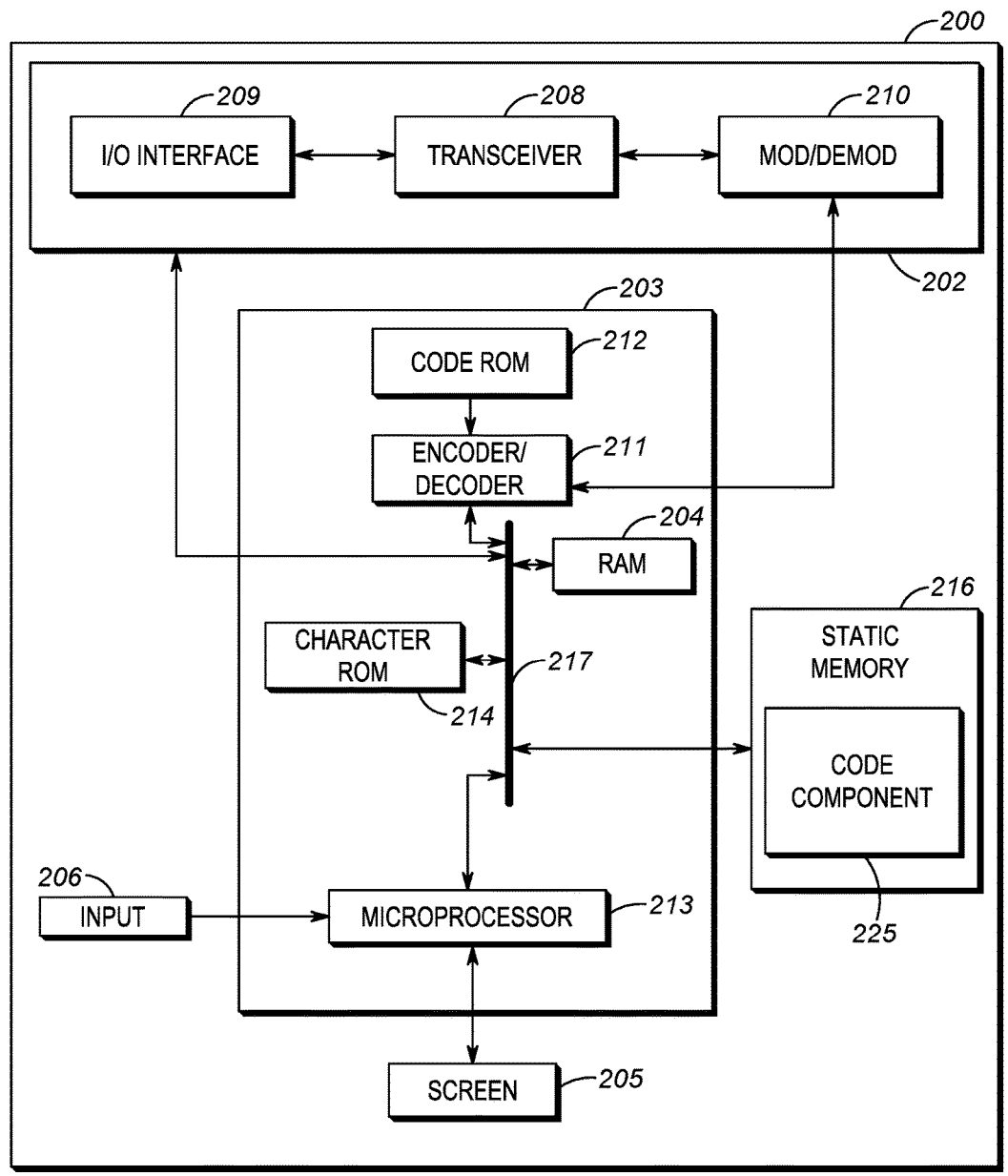
FIG. 2 is a block diagram of a geofence server.

Referring to FIG. 2, a schematic diagram illustrates a geofence server 200 according to some embodiments of the present disclosure. Geofence server 200 may be, for example, the same as or similar to the geofence server 26 of FIG. 1. As shown in FIG. 2, geofence server 200 includes a communications unit 202 coupled to a common data and address bus 217 of a processing unit 203. The geofence server 200 may also include an input unit (e.g., a touch screen, touchpad, . . . , etc.) 206 and a display screen 205, each coupled to be in communication with the processing unit 203. (Note that touch screen 206 and display screen 205 may comprise a single touch screen).

The processing unit 203 may include an encoder/decoder 211 with an associated code Read Only Memory (ROM) 212 for storing data for encoding and decoding voice, data, control, or other signals transmitted or received by geofence server 200. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 20, 40 of FIG. 1, with other devices in the communications network 10, and/or with the dispatch console 38. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205, the input 206 also receiving touch speed and/or pressure from the input unit 206. The character ROM 214 stores code for decoding or encoding data such as control channel messages and/or data or voice messages that may be transmitted or received by the geofence server 200. Static memory 216 may store operating code 225 for the microprocessor 213 that, when executed, performs one or more of the steps described with respect to creating a geofence having parameters based on an input on touch screen 205. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

During creation of a geofence, touch screen 205/206 will receive an input, for example, from a user's finger. The touch screen 205/206 will also determine a pressure, a speed of creation (e.g., swipe speed during the drawing of the geofence boundaries), and a location on a map. Microprocessor 213 will receive these inputs and create a geofence accordingly. More particularly, a measurement of touching pressure and/or the movement speed (swipe speed) is received by microprocessor 213. Microprocessor creates 213 and stores the geofence with parameters based on the touching pressure and/or the movement speed. An example is given below in Table 1.

TABLE 1

Geofence Parameter Example

| User Input | Swipe Parameter | Evaluation Result | Geofence Created with the following parameters that are stored at server, and conveyed graphically to a user |
|---|---|---|---|
| User swipes a geometric shape (e.g., an oval) around an area on a map | Swiping velocity | Fast swiping | user should limit exposure; i.e. utilize hazmat suit or other tool to manage environment elements. Accelerated speed at edge due to open line of gun fire |

TABLE 1-continued

Geofence Parameter Example

| User Input | Swipe Parameter | Evaluation Result | Geofence Created with the following parameters that are stored at server, and conveyed graphically to a user |
|---|---|---|---|
| User swipes a geometric shape (e.g., an oval) around an area on a map | Touch pressure | Slow swiping | Dry brush that can burn quickly Border of high value area requiring additional resources Fire break in place that can manage local fire |
| | | Intensively heavy press | Environmental risk area; i.e. gas, radiation, etc. Highlight risk due to open line of gun fire Direction to dig a wide fire break to manage local fire Resource deployment (e.g. personnel, drones, vehicles) needed immediately |
| | | light weight press | Minimal environmental risk area. Border with reduced danger due to proximity to incident No fire break required Reduced resource demand |
| User swipes a geometric shape (e.g., an oval) around an area on a map | Thickness of pressure area (e.g., shape created with fingernail (thin) or finger tip (thick)) | Thick press area | Accuracy of geofence hysteresis to limit reporting of crossing "jitter". Distance away from area for supporting resources (vehicles, support structures, drone positioning) |
| | | Thin press area | Tight geo-fence crossing accuracy requirement due to proximity to incident or geographic layout in association to incident Preferred incident entry/staging area due to limited risk from incident |

As is evident, a swipe velocity, or a swipe pressure may be associated with geofence parameters. A slow swipe may comprise any swipe lower than a predetermined threshold, for example, 2 cm/second, while a fast swipe may comprise any swipe faster that the predetermined threshold. A light swipe may comprise any swipe made having a pressure less than a predetermined threshold, e.g., ½ Newton, while a heavy swipe may comprise any swipe greater than the predetermined threshold. A thick swipe may comprise a swipe made with a fingertip, while a thin swipe may comprise a swipe made with a fingernail.

Figure 3:
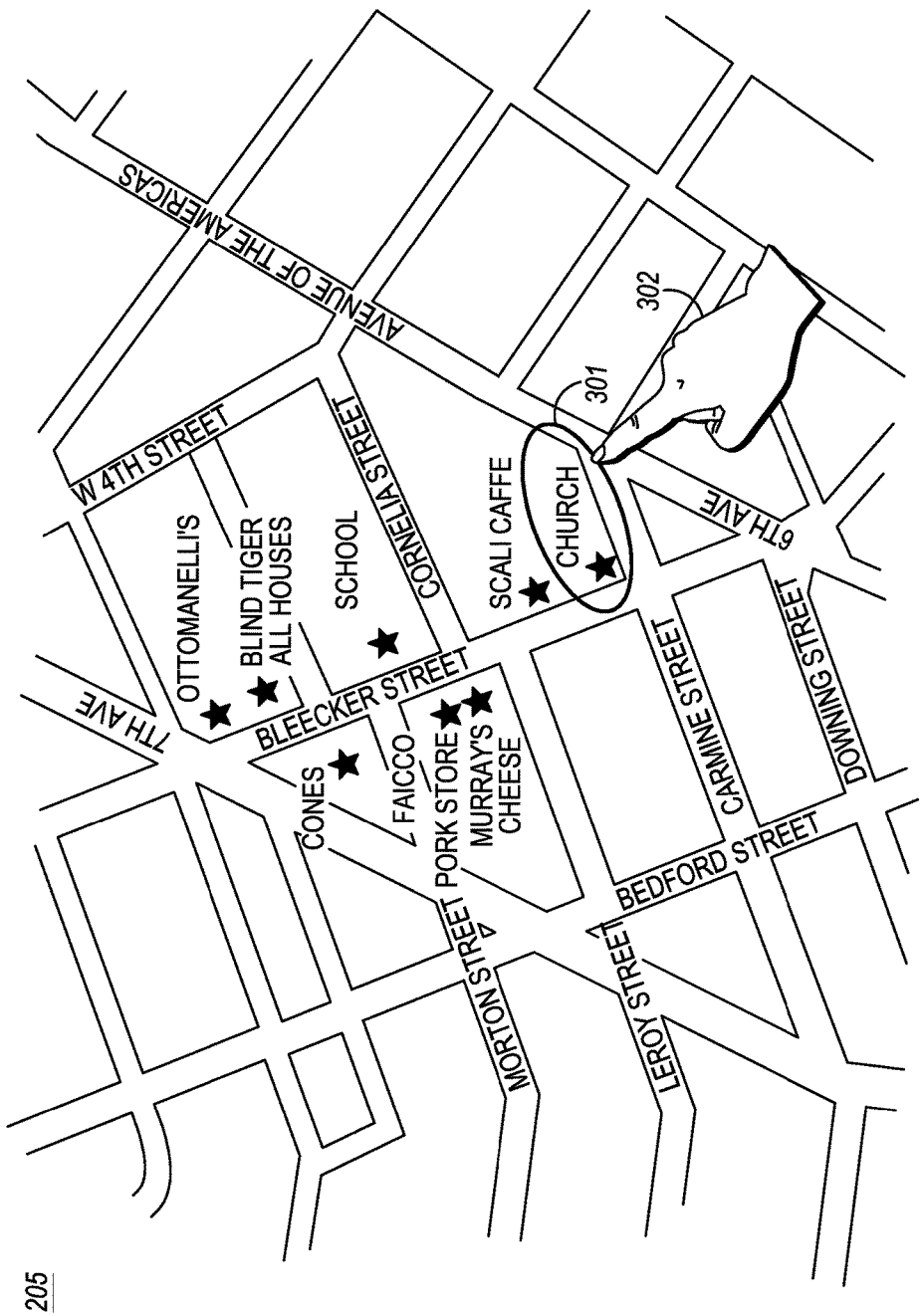
FIG. 3 illustrates a creation of a geofence.

FIG. 3 illustrates a geofence being created in accordance with the present invention. As discussed above, an operator sitting at, for example, touch screen 205/206 may create the geofence by dragging their finger over a map displayed on a touch screen 205/206. However, in alternate embodiments, any device in the field (e.g., devices 12-18) is capable of creating a geofence in a similar manner. During operation, the user will create a geofence around a particular area by dragging their finger 302 to define the boundaries of the geofence. More particularly, a geofence boundary will be placed at points where the user's finger 302 touches the touch-screen 205.

In this particular example, the user has created geofence 301 around a church by dragging their finger across the touch screen 205/206. As discussed above, the geofence will be created having parameters that are based on a type of touch used when creating the geofence.

It should be noted that if the geofence was created by a device other than the geofence server, the geofence boundaries and parameters will be conveyed to the geofence server via network 24 so that the geofence server may monitor user locations and appropriately apply the geofence parameters to the users.

It should be noted that while the geofence parameters are stored and "enforced" by a geofence server, all users, and the operator of the geofence server will receive a visual indication of the geofence parameter. In a preferred embodiment of the present invention the geofence parameter(s) are conveyed to the users via a type of border used to show the geofence. This is illustrated in FIG. 4.

Figure 4:
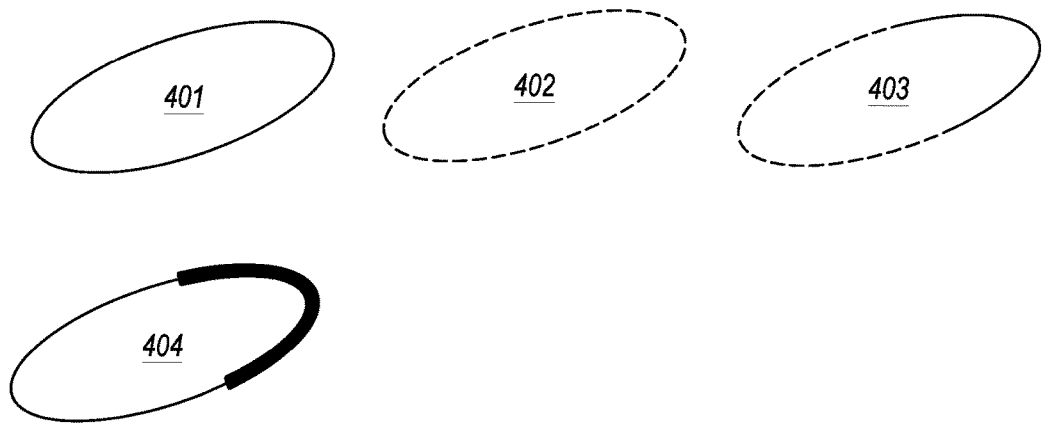
FIG. 4 illustrates geofence boundaries displayed on a touch screen.

FIG. 4 illustrates some examples of geofence boundaries as displayed to users. In a preferred embodiment of the present invention a color of a boundary is associated with a type of touch/press when created a geofence, although this is not shown in FIG. 4. For example, a heavy press might be displayed as a red boundary, while a light touch might be displayed as a blue boundary. Other examples are illustrated in FIG. 4.

A line type may be utilized to display a boundary parameter. So for example, a solid line 401 may be used to display a geofence boundary that has a first parameter (e.g., excludes all personnel), while a dashed line 402 might be used to display a geofence boundary having a second parameter (e.g., allows all personnel). The creator of the geofence may have used a heavy pressure when creating geofence 401 and a light pressure when creating geofence 402.

Multiple parameters may be conveyed in a single geofence boundary. So for example, consider geofence 403. This geofence was created by using a first touch type (e.g., fast swipe) to create a first portion of the geofence, and by using a second touch type (e.g., slow swipe) to create a second portion of the geofence. In this particular example the first portion of geofence 403 may be displayed as a dashed line, while the second portion may be displayed as a solid line. In this example, the type of line indicates a geofence parameter. So, for example, the solid line may indicate where extra personnel are required.

A line thickness may be utilized to convey geofence parameters as indicated in geofence 404. So for example, a heavy press may be drawn as a geofence border having a thick line, while a light press might be conveyed as a geofence border having a thin line. As discussed above, the thick and thin lines convey information on differing geofence parameters.

Figure 5:
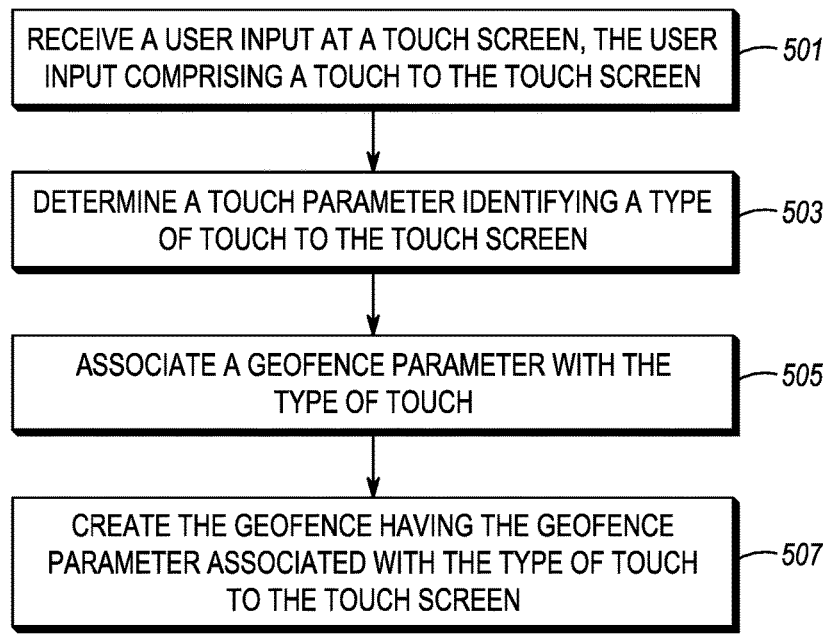
FIG. 5 is a flow chart showing operation of the geofence server of FIG. 2.

FIG. 5 is a flow chart showing operation of the geofence server of FIG. 2. The logic flow begins at step 501 where touch screen 205/206 receives a user input that comprises a touch to the touch screen. At step 503 logic circuitry 213 determines a touch parameter identifying a type of touch to the touch screen and associates a geofence parameter with the type of touch (step 505). Finally, at step 507 logic circuitry 213 creates the geofence having the geofence parameter associated with the type of touch to the touch screen.

As discussed above, the user input comprises may comprise a user drawing a geofence boundary on the touch screen with their finger or alternatively with a stylus. Additionally, logic circuitry 213 may cause the geofence boundary to be displayed on the touch screen, wherein the geofence boundary may be displayed having a characteristic associated with the type of touch to the touch screen.

As discussed above, the geofence parameter is taken from the group consisting of: a geofence border requiring higher than typical resource deployment along that border, environment risk levels, rate of movement around the geofence boundary, hysteresis associated with geofence border crossing, alert parameters, and allowed individuals within the geofence.

As discussed above, the type of touch comprises a heavy press to the touch screen, a light press to the touch screen, a fast swipe to the touch screen, or a slow swipe to the touch screen.

With FIG. 2 and FIG. 5 in mind, an apparatus is provided comprising a touch screen having a user touch as an input, and logic circuitry determining a touch parameter identifying a type of touch to the touch screen, associating a geofence parameter with the type of touch, and creating the geofence having the geofence parameter associated with the type of touch to the touch screen.

In the foregoing specification, specific embodiments have been described. However, one of ordinary skill in the art appreciates that various modifications and changes can be made without departing from the scope of the invention as set forth in the claims below. For example, while the above description was given with the type of touch comprising a fast/slow swipe or a heavy/light press, one of ordinary skill in the art will recognize that other touch parameters may be utilized instead. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to create a geofence, the method comprising the steps of:
   receiving a user input at a touch screen, the user input at the touch screen comprising a touch to the touch screen;
   determining an amount of touch pressure of the touch to the touch screen;
   associating a geofence parameter with the amount of touch pressure, wherein a first touch pressure is associated with a first geofence parameter and a second touch pressure is associated with a second geofence parameter; and
   creating the geofence having the geofence parameter.

2. The method of claim 1, wherein the user input at the touch screen comprises a user drawing a geofence boundary on the touch screen.

3. The method of claim 2, further comprising the step of:
   displaying the geofence boundary on the touch screen, wherein the geofence boundary is displayed having a characteristic associated with the amount of touch pressure to the touch screen.

4. The method of claim 1, wherein the geofence parameter is taken from the group consisting of: a geofence border requiring higher than typical resource deployment along that border, environment risk levels, rate of movement around a geofence boundary, hysteresis associated with geofence border crossing, alert parameters, and allowed individuals within the geofence.

5. A method to create a geofence, the method comprising the steps of:
   receiving a user input at a touch screen, the user input at the touch screen comprising a touch to the touch screen that traces an outline of a geofence;
   determining a touch pressure to the touch screen, wherein the touch parameter is taken from the group consisting of a light press, and a heavy press;
   associating a geofence parameter with the touch pressure such that a light press is associated with a first geofence parameter and a heavy press is associated with a second geofence parameter;
   creating the geofence having the geofence parameter; and
   displaying a geofence boundary on the touch screen.

6. The method of claim 5, wherein the geofence parameter is taken from the group consisting of: a geofence border requiring higher than typical resource deployment along that border, environment risk levels, rate of movement around the geofence boundary, hysteresis associated with geofence border crossing, alert parameters, and allowed individuals within the geofence.

7. An apparatus comprising:
   a touch screen having a user touch as an input;
   logic circuitry determining a touch pressure to the touch screen, associating a geofence parameter with the touch pressure such that a first geofence parameter is associated with a first touch pressure and a second geofence parameter is associated with a second touch pressure, and creating the geofence having the geofence parameter.

8. The apparatus of claim 7, wherein the user input comprises a user drawing a geofence boundary on the touch screen.

9. The apparatus of claim 8, wherein the touch screen displays the geofence boundary having a characteristic associated with touch pressure to the touch screen.

10. The apparatus of claim 7, wherein the geofence parameter is taken from the group consisting of: a geofence border requiring higher than typical resource deployment along that border, environment risk levels, rate of movement around the geofence boundary, hysteresis associated with geofence border crossing, alert parameters, and allowed individuals within the geofence.

* * * * *